United States Patent [19]

Almgren et al.

[11] Patent Number: 5,095,525
[45] Date of Patent: Mar. 10, 1992

[54] MEMORY TRANSFORMATION APPARATUS AND METHOD

[75] Inventors: Ted C. Almgren, Yorba Linda; James M. Mitchell, Costa Mesa, both of Calif.; Gregory A. Phillips, Arvada, Colo.

[73] Assignee: Rockwell International Corporation, El Segundo, Calif.

[21] Appl. No.: 371,167

[22] Filed: Jun. 26, 1989

[51] Int. Cl.$^5$ .................. G06F 12/00; G06F 11/00; H04L 9/00

[52] U.S. Cl. .................. 395/400; 371/2.2; 371/38.1; 380/4; 364/DIG. 1; 364/DIG. 2

[58] Field of Search ... 364/200 MS File, 900 MS File; 380/4; 371/2.2, 38

[56] References Cited

U.S. PATENT DOCUMENTS

| | | | |
|---|---|---|---|
| 4,056,819 | 11/1977 | Lukas | 364/200 |
| 4,168,396 | 9/1979 | Best | 364/200 |
| 4,195,200 | 3/1980 | Feistel | 364/900 X |
| 4,246,638 | 1/1981 | Thomas | 364/200 |
| 4,488,001 | 12/1984 | Cooley et al. | 380/4 |
| 4,506,364 | 3/1985 | Aichelman, Jr. et al. | 364/900 X |
| 4,525,599 | 6/1985 | Curran et al. | 364/200 |
| 4,545,032 | 10/1985 | Mak | 364/900 |
| 4,556,960 | 12/1985 | Cohn et al. | 364/900 |
| 4,573,119 | 2/1986 | Westheimer et al. | 364/200 |
| 4,698,617 | 10/1987 | Bauer | 380/4 X |
| 4,727,474 | 2/1988 | Batcher | 364/200 |

*Primary Examiner*—Stuart N. Hecker
*Assistant Examiner*—Michael A. Whitfield
*Attorney, Agent, or Firm*—H. Fredrick Hamann; George A. Montanye; Tom Streeter

[57] ABSTRACT

A computer memory is transformed such that a data word to be sent to an address is transformed into a transformed data word, and the address to which it is to be sent is transformed to a transformed address. Such transformations are by inversion and permutation of the memory lines (address or data). The data transformation process depends on the address. The data inverse transformation process also depends on the address, but there is no address inverse transformation process. The invention may be used whenever it is desired to more nearly equalize the use of all the bits of the memory, or to impede unauthorized persons from extracting the virtual addresses and data from the transformed addresses and data.

20 Claims, 6 Drawing Sheets

|   | APV | AIV | ADDRESS (A=235) | PERMUTED ADDRESS (PA=221) | TRANSFORMED ADDRESS (TA=191) |
|---|-----|-----|-----------------|---------------------------|------------------------------|
| i | J   |     |                 |                           |                              |
| 0 | 3   | 0   | 1 | 1 | 1 |
| 1 | 6   | 1   | 1 | 0 | 1 |
| 2 | 1   | 0   | 0 | 1 | 1 |
| 3 | 7   | 0   | 1 | 1 | 1 |
| 4 | 5   | 0   | 0 | 1 | 1 |
| 5 | 2   | 1   | 1 | 0 | 1 |
| 6 | 4   | 1   | 1 | 1 | 0 |
| 7 | 0   | 0   | 1 | 1 | 1 |

|   | DPV |     |     | DPV' |     | K=4 |
|---|-----|-----|-----|------|-----|-----|
| i | J   | J+A | J'  | J+A' |     |     |
| 0 | 2   | 237 | 1   | 13   |     |     |
| 1 | 0   | 235 | 3   | 11   |     |     |
| 2 | 3   | 238 | 2   | 14   |     |     |
| 3 | 1   | 236 | 0   | 12   |     |     |
|   |     | A=235 |   | A'=11 |     |     |

MEMORY TRANSFORMATION APPARATUS AND METHOD

TECHNICAL FIELD

This invention relates to apparatus and methods for transforming information in a computer memory, and has particular reference to apparatus and methods for transforming both the data word to be stored at an address in the memory and the address at which it is to be stored.

BACKGROUND ART

Computers are used to process information. "Information", as used herein, includes computer programs, the data which a program may process, the addresses at which the data is to be stored, and, generally, anything which may be held in a computer memory. Information is copied into the computer's memory from some storage medium. The computer's processing unit processes the information in the memory until it is in the desired form, and then copies the processed information out to a storage medium, which is generally (although not invariably) the same as the medium from which the unprocessed information was copied. The processed information (and, often, some or all of the unprocessed information) remains in the computer's memory.

This remaining information is generally located in consecutive addresses. Such consecutive addressing may be undesirable for any of a number of reasons. Certain memory addresses may be overused, while others are hardly used at all. If the information is sensitive, consecutive addressing may ease the task of an unauthorized person who seeks access to it, even if it is erased or overwritten before the memory is returned to non-sensitive use. Such erasing or overwriting procedures may be both tedious and not completely effective. Other reasons will occur to those skilled in the art.

Likewise, the data word stored at each address may reside in only a few of the many bits available at that address. This may also be undesirable, for reasons similar to those for consecutive addressing: resource misallocation, reduced security, and the like.

SUMMARY OF INVENTION

The present invention transforms the address at which a data word is stored from a virtual address at which the processing unit considers the word to be stored, to a transformed address at which the word is physically stored. When a data word is needed from a virtual address, the present invention recalculates the transformed address at which the word was physically stored, and fetches the word from that address. No inverse transformation of the address is required.

The virtual data word to be stored at each virtual address is also transformed to a transformed data word, which is the form in which it is physically stored. Once the transformed word has been fetched, it is inverse transformed to recover the virtual word.

The present invention comprises transformed memory storage and retrieval apparatus, or, alternatively, a method for transforming memory storage and retrieval.

Viewed as an apparatus, the present invention comprises address transformation means, virtual information manipulation means, and transformed information manipulation means. The address transformation means comprises means for determining, for each virtual address, exactly one corresponding transformed address, each transformed address being determined by exactly one corresponding virtual address. The virtual information manipulation means comprises means for inputting a virtual word of data and exactly one corresponding virtual address to which the virtual data word is to be outputted; means for transforming the virtual data word to a transformed word of data; and means for outputting the transformed data word and the transformed address. The virtual data transformation means depends upon the virtual address, upon the transformed address determined from the virtual address by the address transformation means, or upon both the virtual address and the transformed address. The transformed information manipulation means comprises means for inputting a virtual address from which a virtual word of data is to be outputted; means for outputting a transformed address determined from the virtual address by the address transformation means; means for inputting a transformed word of data from the transformed address; means for inverse transforming the transformed data word to a virtual data word; and means for outputting the virtual data word. The transformed data inverse transformation means functions inversely of the virtual data transformation means.

Viewed as a method, the present invention comprises a method of virtual information manipulation, and a method of transformed information manipulation. The virtual information manipulation method comprises inputting a virtual word of data and exactly one corresponding virtual address to which the virtual data word is to be outputted; determining, for the virtual address, exactly one corresponding transformed address; transforming the virtual data word to a transformed word of data; and outputting the transformed data word and the transformed address. The transformed address is determinable by exactly one corresponding virtual address, and the virtual data transformation process depends upon the virtual address, the transformed address, or both the virtual address and the transformed address.

The method of transformed information manipulation comprises inputting a virtual address from which a virtual word of data is to be outputted; determining, by the process set out in the previous paragraph, the corresponding transformed address; inputting a transformed word from the transformed address; inverse transforming the transformed data word to a virtual data word; and outputting the virtual data word. The transformed data inverse transformation process is the inverse of the virtual data transformation process set out in the preceding paragraph.

Whether viewed as an apparatus or as a method, the present invention conveniently includes the following restrictions, although, in its broadest conception, these restrictions are not necessary.

The virtual address and transformed address conveniently comprise an equal number of bits, and the transformed address should be determined by inverting selected bits of the virtual address, by permuting the bits of the virtual address, or by both such inversion and permutation. Likewise, the virtual data word and transformed data word conviently comprise an equal number of bits, and the transformed data word conviently are determined by inverting selected bits of the virtual data word, by permuting bits of the virtual data word, or by both such inversion and such permutation.

The permutation of the bits of the virtual data word conviently depends on the virtual address, and the inversion of the bits of the virtual data word conveniently depends on the transformed address. The bits of the address conveniently are inverted by a process comprising XORing the bits of the address with the corresponding bits of a key or a portion of a key.

The bits of the virtual data word conveniently are permuted by a process comprising adding the data permutation portion of a key to the virtual or transformed address, or to both such addresses, or to a portion of the virtual or transformed address, or of both such addresses, then dividing the resulting sum by the number of bits of the data word, and then permuting according to the remainder.

The bits of virtual data word, or the permuted virtual data word, conviently is inverted by a process comprising XORing each bit of the word with a corresponding inversion control bit. Each inversion control bit conviently is formed by a process comprising ANDing together each of three bits of a key with a corresponding bit of a transformed address, then ORing together the logical products thus formed to form first, second, and third logical products, and then XORing the logical sum thus formed with a fourth bit of a key.

Let k be the number of bits of the transformed address, and consider the formation of the ith inversion, where $0 \leq i \leq k-1$. The first logical product conviently is formed by ANDing together the first key bit with the xth bit of the transformed address, where $x = i+1$ if $i+1 < k$, and $x = i+1-k$ if $i+1 \geq k$. The second logical product conviently is formed by ANDing together the second key bit with the yth bit of the transformed address, where $y = i+2$ if $i+2 < k$, and $y = i+2-k$ if $i+2 \geq k$. The third logical product conveniently is formed by ANDing together the third key bit with the zth bit of the transformed address, where $z = i+3$ if $i+3 < k$, and $z = i+3-k$ if $i+3 \geq k$. Thus $0 \leq x \leq k-1$, $0 \leq y \leq k-1$, and $0 \leq z \leq k-1$, as well.

It is a purpose of the present invention to more equally distribute the usage of bits in a data word, and of addresses in a memory.

It is a further purpose of the present invention to impede the progress of unauthorized persons attempting to extract meaningful sensitive information from a memory after the memory has been returned to nonsensitive use.

It is a further purpose of the present invention to accomplish the foregoing purposes without imposing significant constraints on the operation of either the processor or the memory.

It is a feature of the present invention that the address transformation process comprises both inversion and permutation of its bits.

It is a further feature of the present invention that the data transformation process comprises both inversion and permutation of its bits.

It is a further feature of the present invention that the data transformation process depends on the address, and not only on an entirely external key.

It is an advantage of the present invention that the data transformation process, depending on the address and not only on a key, provides a more thorough transformation of the data bits.

BRIEF DESCRIPTION OF DRAWINGS

These and other purposes, features, and advantages are more readily understood by reference to the accompanying drawings wherein.

PREFERRED EMBODIMENT FOR CARRYING OUT THE INVENTION

A computer comprises, in general terms, a central processing unit (CPU) and a memory. The CPU extracts words of data from the memory, processes them, and returns the processed words to the memory.

When the CPU looks into the memory to read or write a word, it must first tell the memory where the memory should fetch the word from (to be read to the CPU), or where the word which the CPU has just produced should be written in the memory. A convenient and nearly universal way of doing so is to take advantage of the fact that computers are binary; they process and remember large numbers of 1s and 0s, but only 1s and 0s. Each location within the memory may be given an address, which is a binary (base 2) number. If the address can have any mixture of 16 bits (1s and 0s), then $2^{16} = 65,536$ different addresses can be specified.

A convenient way for the CPU to tell the memory which address it wants is to use an address bus. This is a collection of 16 parallel wires (address lines) running from the CPU to the memory. The CPU either puts (1) or declines to put (0) a voltage (or current) on each wire. These 16 1s and 0s travel together down the bus from the CPU to the memory, each on its own wire, much like 16 children traveling together from home to school on a school bus, each in his or her own seat.

Each memory location may hold any of a number of words. It is convenient for this number of words to be $2^8 = 256$, so that each word can be specified by 8 bits. This allows a data bus of 8 wires (data lines), each carrying a separate bit of the data word, to also run between the CPU and the memory. When the CPU wants to write a word to the memory, this structure allows the memory to simultaneously know what word should be written and where to write it. If the CPU wants to read a word from a particular memory location, it sends the address to the memory over the address bus, and the memory sends the word from that address back to the CPU over the data bus.

Information as to whether the CPU wants to read or write, and much additional information, is sent from the CPU to the memory over a third bus, the control bus. The control bus is not affected by the present invention. However, since the transformation apparatus in the address bus and data bus takes a small but nonzero time to do its work, the CPU must appropriately delay the instructions which it sends over the control bus, especially write instructions.

The present invention takes advantage of this discrete structure of wires between the CPU and the memory to more evenly distribute words throughout the various addresses of the memory. The transformation apparatus may be placed in the address lines between the CPU and the memory, so that a bit which enters the apparatus from the CPU on one address line leaves for the memory on an entirely different address line. When the memory receives the word being simultaneously transmitted over the data bus, it therefore stores the word in an entirely different address. This process is called permutation of address lines.

The apparatus need not limit itself to permuting a bit from one address line to another (and, of course, permuting a bit from another, perhaps entirely different, address line to the first). It may also, some of the time, invert the bit from 1 to 0, or 0 to 1. This further changes the physical address at which the memory ultimately stores the word.

The bits of an address may be thus permutated and selectively inverted as many times as may be desired, and in any order (permute first or invert first). Such permutation and inversion is called herein a transformation of the address.

The address is transformed from a virtual address to a transformed address. When the CPU sends a virtual address to the memory, an entirely different transformed address will be received by the memory as the location from which a data word should be read, or to which a data word should be written. Each virtual address has exactly one corresponding transformed address, and vice versa.

The CPU deals only with virtual addresses; the memory deals only with transformed addresses. It is not necessary for either the CPU or the memory to be modified to interface with the apparatus between them in the address lines. It is necessary only to insert the apparatus into the address lines.

The foregoing discussion of transformation of address lines applies with equal force to transformation of the data lines. When the CPU sends a virtual data word to the memory, an entirely different transformed data word will be written in the memory. When the memory sends a transformed word to the CPU, and entirely different virtual (inverse transformed) word will be received by the CPU.

Having made the decision to transform the address and the data word, the question becomes how to accomplish the transformation. Applicants herein use a key, comprising an address portion, or address key, to transform the address, and a data portion, or data key, to transform the data word. The data word transformation and inverse transformation process includes, in addition to its key, the virtual address, the transformed address, or both such addresses, at which the word is stored.

(1) ADDRESS PORTION

The address portion comprises an address permutation vector (APV) and an address inversion vector (AIV).

1a) Address Permutation Victor (APV).

Figure 1:
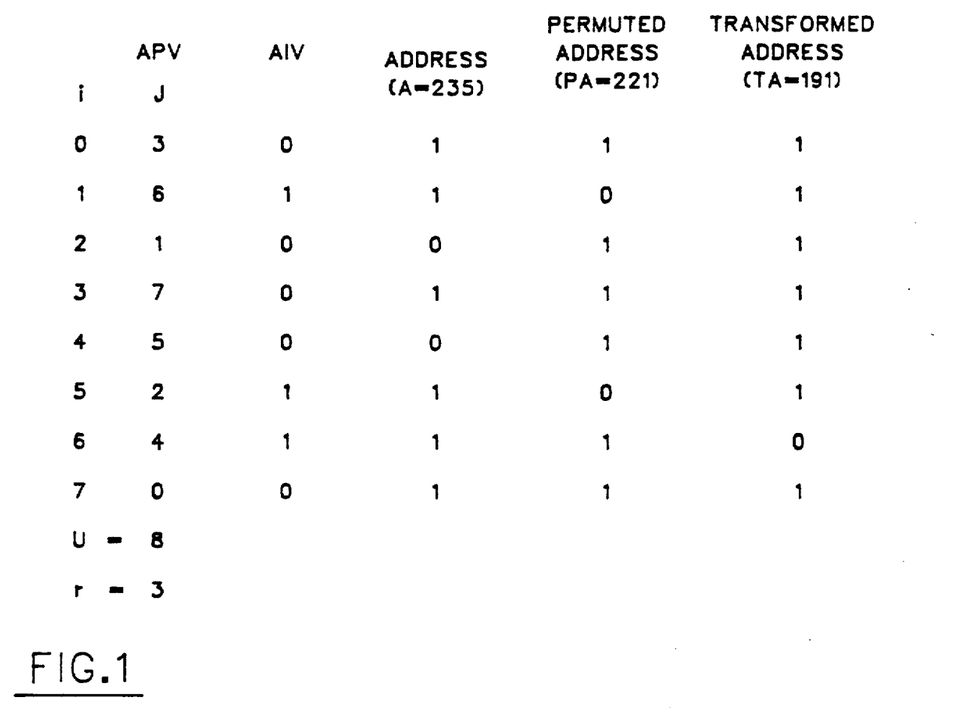
FIG. 1 is a numerical example of address transformation.

Let each address comprise u bits, so that there are u address lines and $n = 2^u$ possible addresses. The APV comprises u fields, each field holding a number between 0 and $u - 1$, and no two fields holding the same number. Let j be the number held in the ith field, where $0 < - 1 < u - 1$. Then a signal arriving on the ith address line departs on the jth address line. The APV thus permutes the bits of the address, which has the effect of permuting the addresses themselves. However, only u fields are required, rather than $n = 2^u$ fields, as would be the case if the addresses were to be permuted directly, rather than permuting their bits. Also, each field need only comprise r bits, where $2^r = u$, in order to hold a number between 0 and $u - 1$. Each field would have to be much larger, comprising u bits, to hold a number between 0 and $n - 1$, if the addresses were to be permuted directly. FIG. 1 shows an example of an APV where $u = 8$ and $r = 3$. An arbitrarily selected address 235, permuted by the APV shown, becomes permuted address 221.

1b) Address Inversion Vector (AIV)

It is not enough that the bits of the address be permuted. If all of the bits happen to be 0, or all happen to be 1, a permutation changes nothing. The problem is less severe, but is still present, when the number of 0 bits and the number of 1 bits are approximately equal. Therefore, after (or before) being permuted, the bits of the address are inverted by the AIV. The AIV comprises u fields, each holding a single bit. The ith bit of the address is XORed with the ith bit of the AIV. If the ith bit of the AIV is 1, then the ith bit of the address is inverted. If the ith bit of the AIV is 0, then the ith bit of the address is passed through unchanged. FIG. 1 also shows a typical AIV for the APV described above. The permuted address 221, inverted by the AIV shown, becomes transformed address 191.

2) DATA PORTION

The data portion comprises a data permutation vector (DPV) and a data inversion matrix (DIM).

2a) Data Permutation Vector (DPV).

Figure 2:
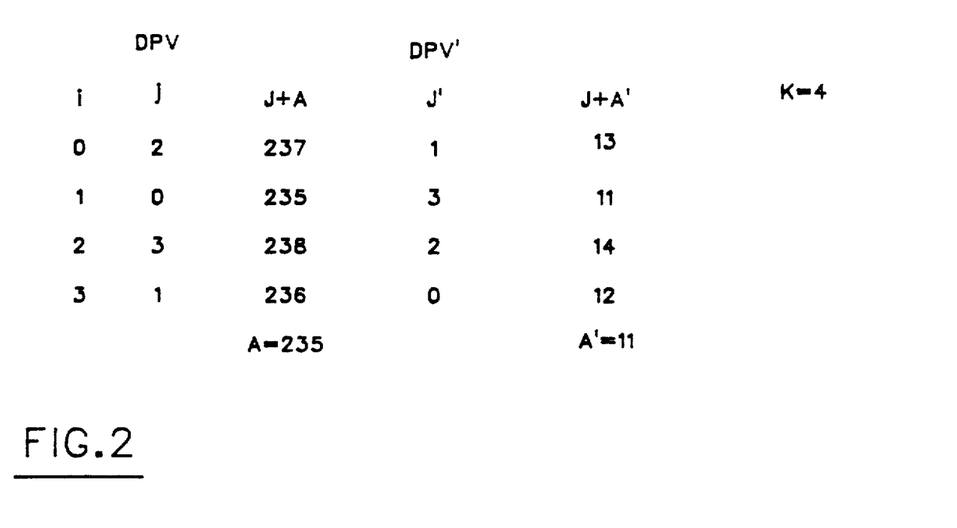
FIG. 2 is a numerical example of data permutation.

Let each word of data comprise k bits, so that there are k data lines and $m = 2^k$ possible data words. The DPV comprises k fields, each field holding a number between 0 and $k - 1$, and no two fields holding the same number. As with the APV, we let j be the number held in the ith field, where $0 \leq i \leq k - 1$. FIG. 2 shows a typical DPV for $k = 4$.

It would be possible, as with the APV, for a signal arriving on the ith data line to depart on the jth data line. Instead, however; we create a modified data permutation vector (MDPV, or DPV'). The MDPV, like the DPV, comprises k fields, each field holding a number between 0 and $k - 1$, and no two fields holding the same number. We define j' as the number held in the ith field of the MDPV, and $j' = (j + A) \mod (k)$, where A is the virtual address at which the data word is to be stored, that is, the address before any permutation or inversion. A signal arriving on the ith data line departs on the j'th data line. FIG. 2 also shows $j + A$ and j' for A arbitrarily selected at $A = 235$.

It often will be the case that the number of bits in the data word is less than the number of bits in the address, that is, k is less than u. This is the situation shown in FIGS. 1 and 2, where $k = 4$ and $u = 8$. It then is necessary to add j only to k bits from A (preferably the k least significant bits), that is, $j' = (j + A') \mod (k)$, where A' is the number obtained by extracting the k least significant bits of A (or other set of k bits from A). This simplifies this portion of the invention without complicating the remainder of the invention. $A = 235$ decimal, or 11101011 binary, the four least significant bits of which are 1011 binary, or 11 decimal, so $A' = 11$. This also is shown in FIG. 2.

2b) Data Inversion Matrix (DIM)

As with the bits of the address, and for the same reasons, the bits of the data word must be inverted after (or before) being permuted. It would be possible for the data portion to comprise a data inversion vector (DIV) similar to the AIV, with the ith bit of the data word being XORed with the ith bit of the DIV. While such a DIV is used in the present invention, the DIV is not comprised in the data portion. Instead, it is constructed by operating the DIM on successive bits of the transformed address, that is, on the bits of the virtual address after such bits have undergone permutation and inversion.

The DIM is a matrix of k rows (0 to k−1) and 4 columns, (0 to 3), each element of the matrix holding a single bit. On the ith row, the bit in the zeroth column is ANDed with the i+1st bit of the transformed address to form a first intermediate bit; the bit in the first column is ANDed with the i+2nd bit of the transformed address to form a second intermediate bit; and the bit in the second column is ANDed with the i+3rd bit of the transformed address to form a third intermediate bit. Let be the number of the bit to be ANDed with the DIM bit, that is, t=i+1, or t=i+2, or t=i+3, as appropriate. If t is greater than k−1, then t is replaced with t-k. In this way, t is less than k whenever a DIM bit and a transformed address bit are ANDed together.

The first, second, and third intermediate bits are ORed together to form a fourth intermediate bit. The fourth intermediate bit is in turn XORed with the bit in the third column of the ith row to produce a fifth bit. This fifth bit is the ith bit of the DIV. The ith bit of the virtual data word (that is, the data word before any inversion or permutation) is then XORed with the ith bit of the DIV to form the ith bit of the inverted word. The inverted word may then be permuted to form the transformed word.

Figure 3:
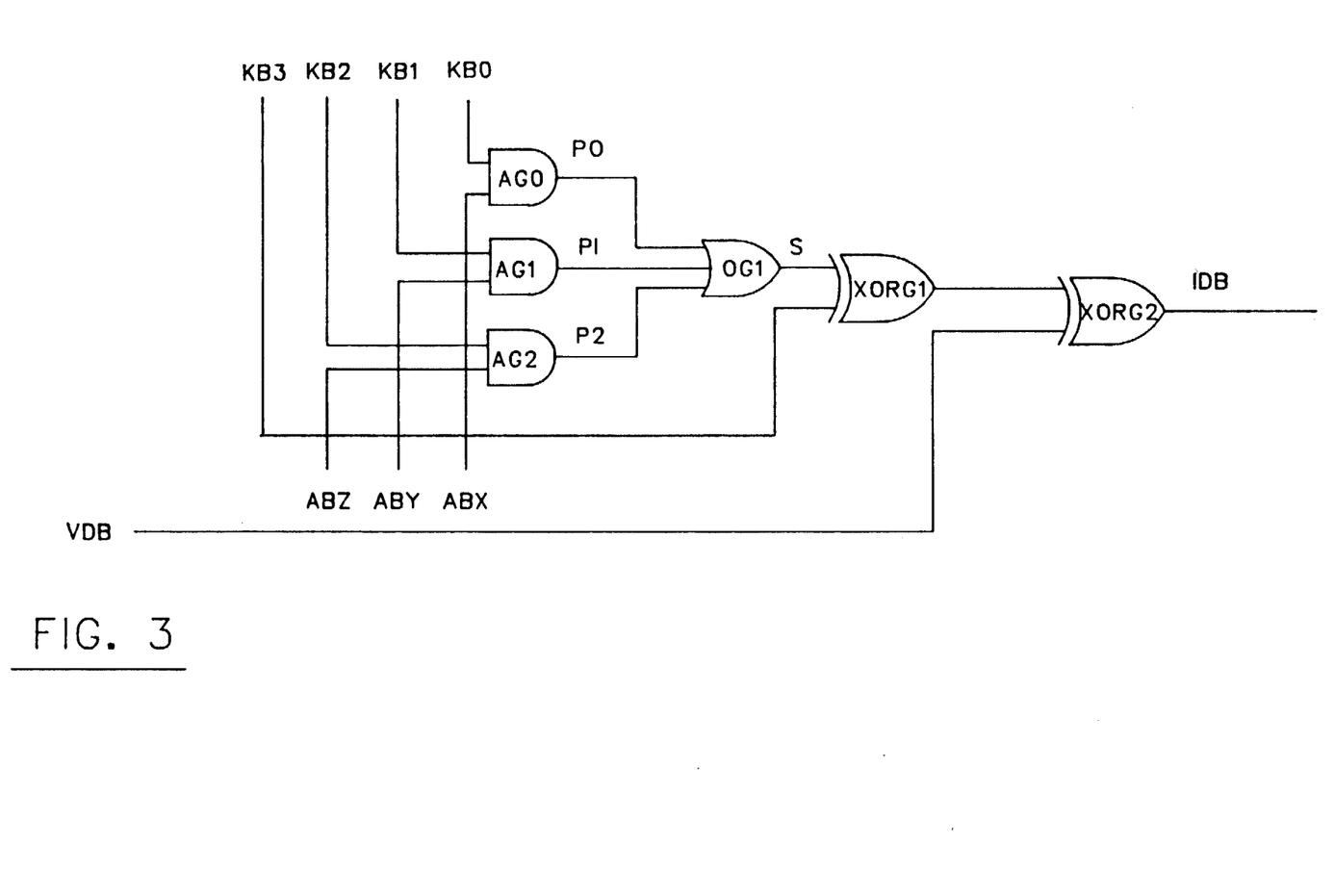
FIG. 3 demonstrates data inversion.
Figure 4A:
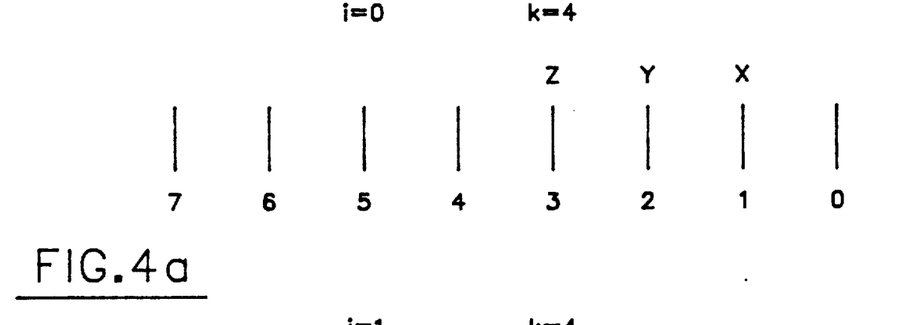
FIGS. 4a-4d demonstrate selection of the transformed address bits to be used in data inversion.
Figure 4B:
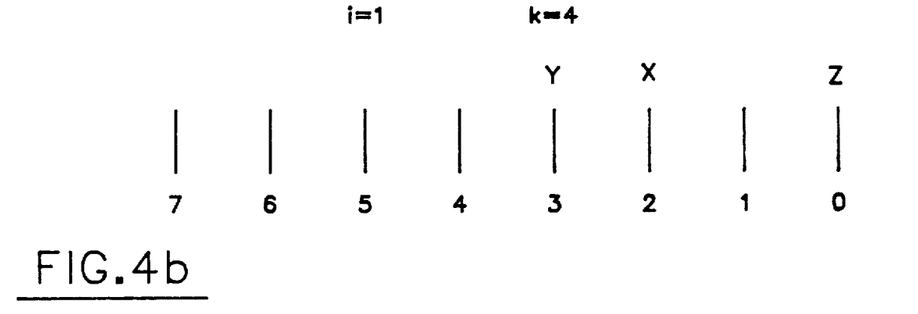
Figure 4C:
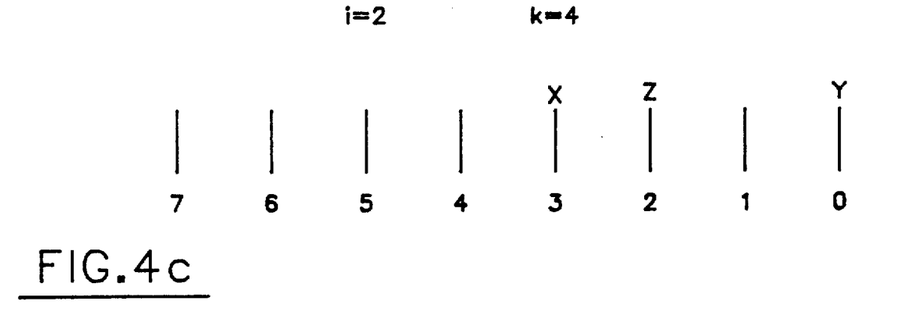
Figure 4D:
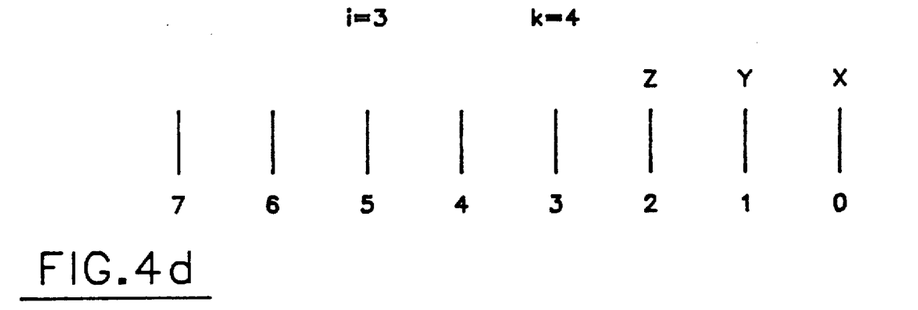

Operation of the DIM is shown in FIG. 3. Key bits 0, 1, and 2 (KB0, KB1, KB2) are ANDed with address bits x, y, and z (ABX, ABY, ABZ) by AND gates 0, 1, and 2 (AG0, AG1, AG2), producing products 0, 1, and 2 (P0, P1, P2). P0, P1, and P2 are also the addends to be ORed together by OR gate OG to produce a sum S, which is XORed by first XOR gate XORG1 with a third key bit KB3 to produce the inversion control bit ICB. ICB is XORed by a second XOR gate XORG2 with a virtual data bit VDB to produce an inverted data bit IDB.

Selection of address bits x, y, and z (ABX, ABY, ABZ) is shown in FIG. 4. In the simplified example shown in FIG. 4, each data word has four bits (k=4), although, as noted below, having 8 data bits is more realistic in practice. Although the transformed address has 8 bits (16 would be more realistic in practice), only the k least significant bits are used. For the 0th data bit (i=0; FIG. 4a), x=1, y=2, and z=3, so it is the first, second, and third transformed address bits which are ANDed into the apparatus shown in FIG. 3. For the first data bit (i=1; FIG. 4b), x=2, y=3, and z=0, so it is the second, third, and zeroth transformed bits which are used in the FIG. 3 apparatus. FIG. 4c covers i=2, and FIG. 4d covers i=3. For quick operation, each bit of the data word is selectively inverted concurrently with the selective inversion of each of the other bits, so the apparatus of FIG. 3 is replicated as many times as there are data bits.

The foregoing description sets out a single inversion followed by a single permutation. It will be readily apparent to those skilled in the art that any number of inversions and permutations may be used, in any order, as the user may find most convenient.

Mathematically, the foregoing discussion may be expressed as follows:

The transformation consists of two parts: a selective inversion of memory (address or data) lines which is controlled by the inverting portion of the key, and a permuting of the same memory lines which is controlled by the permuting portion of the key.

Figure 5:
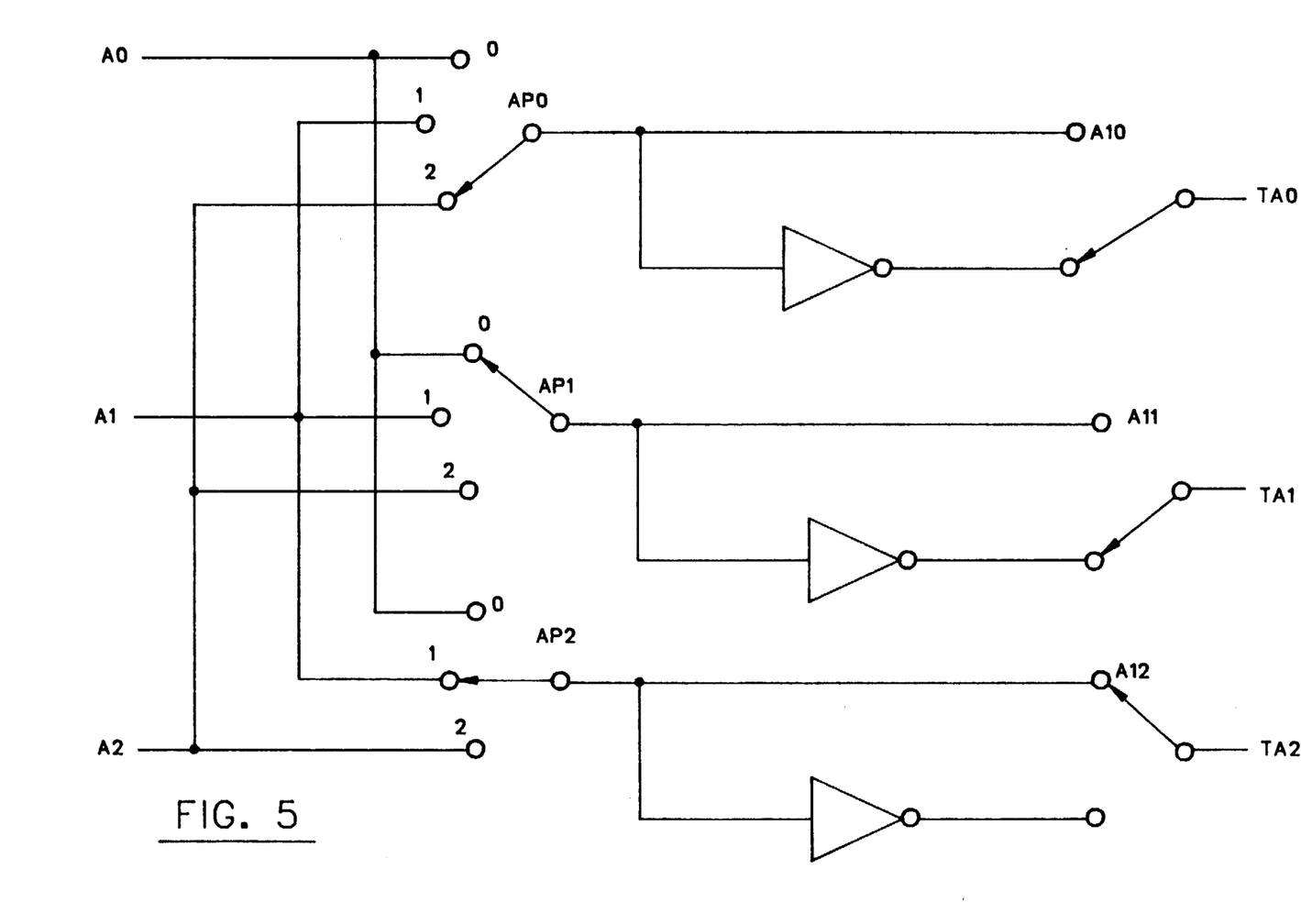
FIG. 5 is a schematic of the address transformation process.

A simplified conceptual diagram of the address transformation is shown in FIG. 5. For conceptual simplicity, an eight address memory (hence three address lines) is assumed. A more realistic memory would have $64K = 65,536 = 2^{16}$ addresses, and thus would have 16 address lines.

A0, A1, and A2 are the three address lines which define memory locations 0 through 7. Each memory address line goes to the respective address line permuting switch AP0, AP1, or AP2. The three permuting switches are set to different positions such that each position is selected by one switch and no position is selected by more than one switch. There are, thus, exactly the same number of positions on each switch as there are switches. This corresponds with the definition of a permutation:

If $R = (r_0, r_1, \ldots, r_{u-1})$, then $P = (P_0, P_1, \ldots, P_{u-1})$ is a permutation of R if, 1) $P_i$ is a member of $(r_0, r_1, \ldots, r_{u-1})$ for all i, and,
2) $P_i$ is not equal to $p_j$ whenever i and j are distinct integers in the range 0 to u−1.

In the example shown in FIG. 5, address line permutation switch AP0 selects address line A2, switch AP1 selects line A0, and switch AP2 selects line A1, so the switch setting is the permutation (2,0,1). We choose to represent the setting of these switches in the form of an address permutation matrix APM in which APM(i,j)=1 if switch i is set to position j and is 0 otherwise. Under this definition, a permutation matrix consists of an identity matrix upon which elementary row interchange operations have been performed. Thus, APM(0,2), APM(1,0), and APM(2,1) are equal to 1; the remaining elements of APM are equal to 0. One can readily convert between the vector representation of the permutation and the matrix representation.

The outputs of the permuting switches go to inverters which form the logical complement of the permuted address inputs. Three address inverting switches, AI0, AI1, and AI2 are set in accordance with the inverting portion of the key. These switches select either the permuted address lines or their complements as the output of the transform logic. Each address line goes to the respective address inverting switch AI0, AI1, or AI2. The inverting portion of the address key has as many bits as there are address inverting switches. In the example shown in FIG. 5, switches AI0 and AI1 invert the line, while AI2 does not. The address inversion vector is therefore (1,1,0), and the inverting portion of the address key is 110.

The transformed addresses TA0, TA1, and TA2, in the schematic of FIG. 1 can be expressed as follows:

$$\begin{aligned} TA0 &= ((A0.AND.APM(0,0)).OR.(A1.AND.APM(0,1)).OR. \\ &\quad (A2.AND.APM(0,2))).XOR.AI0 \\ &= (A2.XOR.AI0) \\ &= A2- \end{aligned}$$

-continued

```
TA1   =   ((A0.AND.APM(1,0)).OR.(A1.AND.APM(1,1)).OR.
          (A2.AND.APM(1,2))).XOR.A11
      =   (A0.XOR.A11)
      =   A0—

TA2   =   ((A0.AND.APM(2,0)).OR.(A1.AND.APM(2,1)).OR.
          (A2.AND.APM(2,2))).XOR.A12
      =   (A1.XOR.A11)
      =   A1
```

As used herein, .XOR. denotes the logical exclusive or function, .AND. denotes the logical and function, .OR. denotes the logical or function, and —denotes the logical negation function.

For u address lines, the total number of possible address transformations is $u! \times 2^u$. This is ample for a memory with only $2^u = m$ addresses.

Figure 6:
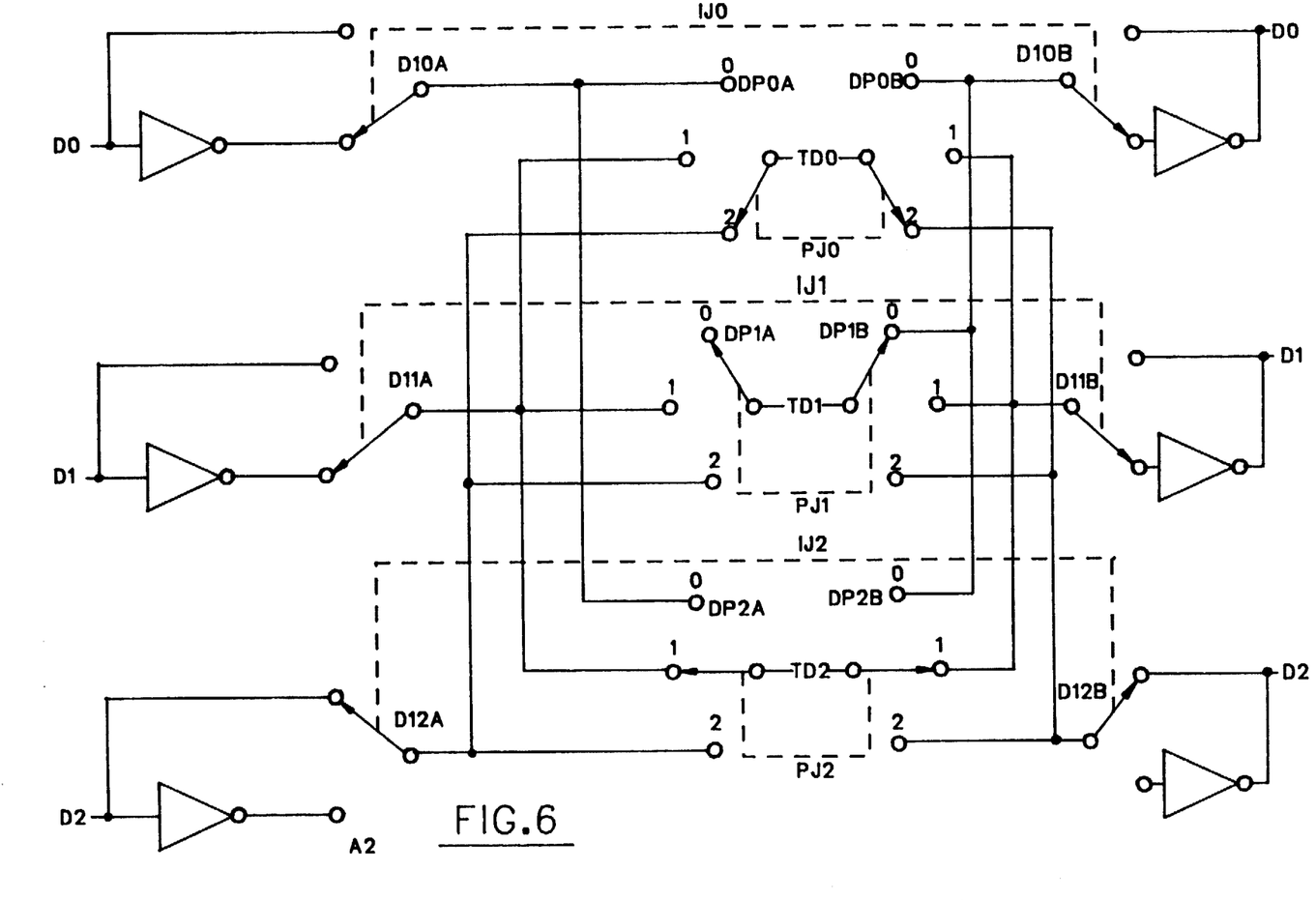
FIG. 6 is a schematic of the data word transformation and inverse transformation process.

FIG. 6 shows a simplified conceptual diagram of the system for data transformation (left side) and inverse transformation (right side). As with FIG. 5, three data lines are assumed, allowing any of eight possible data words to be stored at an address. A more realistic system would have 8 data lines and 256 possible data words.

Data lines D0, D1, and D2 define data words 0 through 7. Each data line goes to the respective data line inverting switch DI0A, DI1A, or DI2A. Each data line inverting switch shown on the left side of FIG. 2 has a corresponding data line inverse inverting switch DI0B, DI1B, or DI2B shown on the right side of FIG. 6.

An inversion joiner IJ0 join switches DI0A and DI0B and causes them to have the same setting. Similar inversion joiners IJ1 and IJ2 similarly join the remaining pairs of inverting switches. DI0 is the setting of switches DI0A and DI0B; DI1 is the setting of DI1A and DI1B; and DI2 is the setting of DI2A and DI2B.

After leaving its inverting switch, each data line goes to the respective data line permuting switch DP0A, DP1A, or DP2A. As with the address line permuting switches, the data line permuting switches are set to different positions such that each position is selected by one switch and no position is selected by more than one switch.

In the example shown in FIG. 6, data line permutating switch DP0A selects data line D2, switch DP1A selects line D0, and switch DP2A selects line D1, so the switch setting is the permutation (2,0,1).

As with the data line inverting switches, the data line permuting switches DP0A, DP1A, and DP2A are respectively joined by permutation joiners PJ0, PJ1, and PJ2 to inverse permuting switches DP0B, DP1B, and DP2B. The permutation joiners set each data line inverse permutation switch to the same position as the like numbered data line permutation switch.

The data word to be stored at the address is transformed in a manner similar to that in which the address is transformed, with two-changes: the data word permutation is a function of the virtual address, and permutation follows, rather than precedes, selective inversion. If the data permutation vector is, for k bits of the data word, $P = (p_0, p_1, \ldots, p_{k-1})$, then we form $P' = (p'_0, p'_1, \ldots, p'_{k-1})$ by taking $p'_i = (p_i + A) \bmod(k)$, where A is the virtual address, k is the number of bits needed to specify a data word, and mod(k) is the modulo k function and represents the remainder on integer division by k. $2^k = m$, where m is the number of possible data words.

In general it is not necessary to use the entire value of A, since only the k least significant bits can affect the result. The actual implementation will save hardware by using a k-bit adder.

The permutation P' is equivalent to a data permutation matrix DPM, which is created by setting DPM(i,p$'_i$) = 1 for all i and setting all other elements of DPM equal to zero. This enables us to formulate equations for the data transformation which are comparable to the equations for the address transformation. For the case of three data bits the equations would be:

```
TD0  =  [(D0.XOR.DI0).AND.DPM(0,0)].OR.
        [(D1.XOR.DI1).AND.DPM(0,1)].OR.
        [(D2.XOR.DI2).AND.DPM(0,2)]

TD1  =  [(D0.XOR.DI0).AND.DPM(1,0)].OR.
        [(D1.XOR.DI1).AND.DPM(1,1)].OR.
        [(D2.XOR.DI2).AND.DPM(1,2)]

TD2  =  [(D0.XOR.DI0).AND.DPM(2,0)].OR.
        [(D1.XOR.DI1).AND.DPM(2,1)].OR.
        [(D2.XOR.DI2).AND.DPM(2,2)]
```

The permutation, and thus the transformation, of data stored in transformed memory locations will be a function of the virtual addresses associated with the transformed memory locations.

The logic controlling the inversion of the data bits is made dependent on the transformed address instead of the virtual address. For each data bit D(i), there is a 4-bit inversion control register ID(i,s), where s runs between 0 and 3. The terms IC(i) which control the inversion for the ith of k data bits (i is between 0 and $k-1$), are:

```
IC(0)    =  ([ID(0,0).AND.TA(1)].OR.
            [ID(0,1).AND.TA(2)].OR.
            [ID(0,2).AND.TA(3)]).XOR.
            ID(0,3)

IC(1)    =  ([ID(1,0).AND.TA(2)].OR.
            [ID(1,1).AND.TA(3)].OR.
            [ID(1,2).AND.TA(4)]).XOR.
            ID(1,3)

IC(k-2)  =  ([ID(k-2,0).AND.TA(k-1)].OR.
            [ID(k-2,1).AND.TA(0)].OR.
            [ID(k-2,2).AND.TA(1)]).XOR.
            ID(k-2,3)

IC(k-1)  =  ([ID(k-1,0).AND.TA(0)].OR.
            [ID(k-1,1).AND.TA(1)].OR.
            [ID(k-2,2).AND.TA(2)]).XOR.
            ID(k-1,3)
```

In the previous data transformation equations for TD0, TD1, and TD2, we would replace DI0, DI1, and DI2 with IC(0), IC(1), and IC(2), respectively. This would make our example equations read:

$$TD0 = (([D0.XOR.IC(0)].AND.DPM(0,0)).OR.$$
$$([D1.XOR.IC(1)].AND.DPM(0,1)).OR.$$
$$([D2.XOR.IC(2)].AND.DPM(0,2))$$
$$TD1 = (([D0.XOR.IC(0)].AND.DPM(1,0)).OR.$$
$$([D1.XOR.IC(1)].AND.DPM(1,1)).OR.$$
$$([D2.XOR.IC(2)].AND.DPM(1,2))$$
$$TD2 = (([D0.XOR.IC(0)].AND.DPM(2,0)).OR.$$
$$([D1.XOR.IC(1)].AND.DPM(2,1)).OR.$$
$$([D2.XOR.IC(2)].AND.DPM(2,2))$$

The shown equations are for transforming the data inputs as they are transferred to memory. Not shown are the equations which perform the inverse transformation on the memory contents as they are transferred to the CPU, but they have a form similar to that of the equations which perform the address transformation, as is shown by an inspection of FIG. 5 and the right side of FIG. 6.

FIG. 6, unlike FIG. 5 represents only a snapshot in time. The inversion select switches are a function of the address, and are not immutably fixed as they are shown for the address transform. In fact, the setting shown in FIG. 6 is likely to be comparatively rare.

In summary, if a processor has u address lines and k data lines, there will be u r-bit registers to control the address permutation, where $2^r = u$, and one u-bit register to control the address bit inversion. There will also be a s k-bit registers to control the data permutation, where $2^s = k$, that is, s is the binary logarithm of k. There are also k 4-bit registers to control the data inversion. Together they constitute the key variable for the transformation.

Figure 7A:
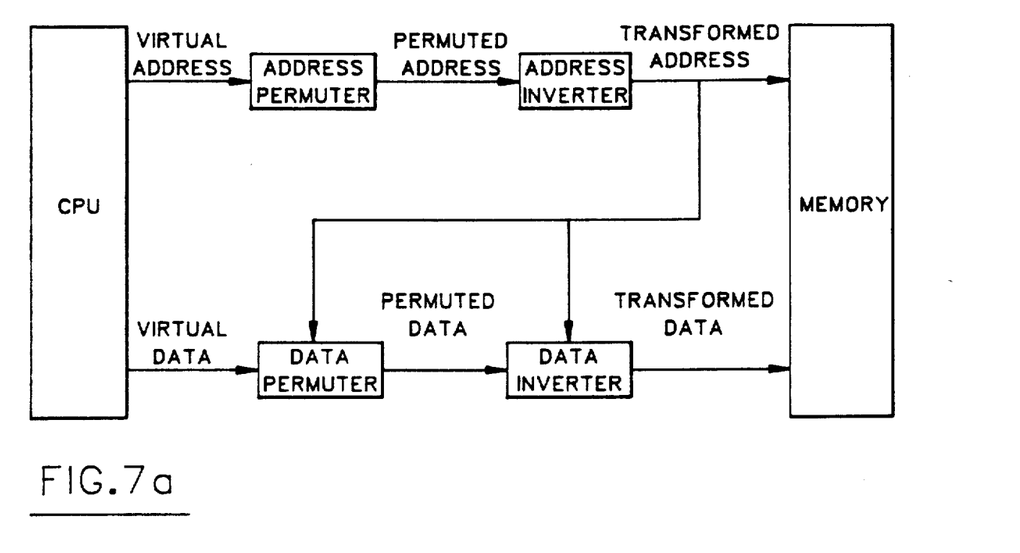
FIGS. 7a and 7b, shows an overall view of the present invention.
Figure 7B:
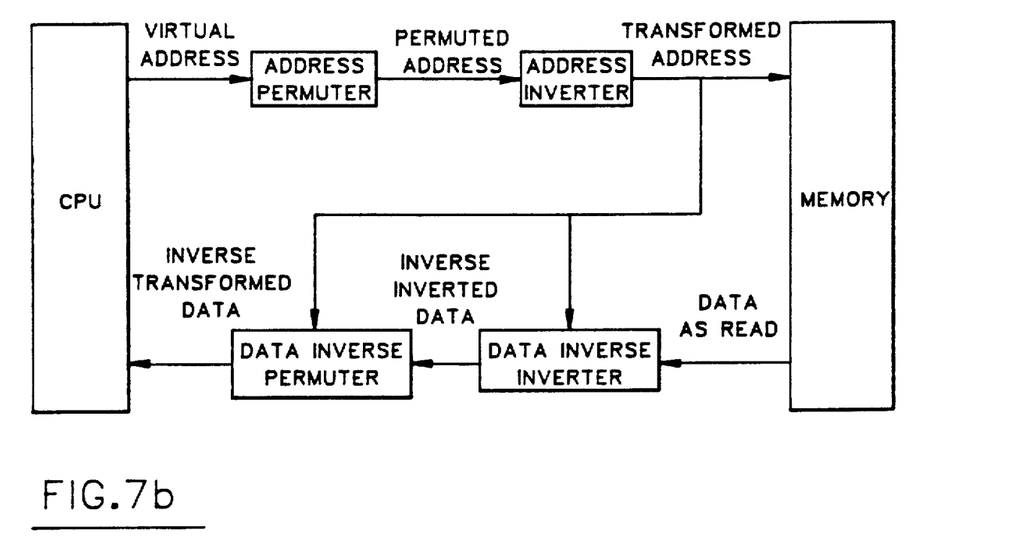

FIG. 7 shows an overall view of the present invention. FIG. 7a shows a write operation, while FIG. 7b shows a read operation.

In FIG. 7a, a CPU, seeking to write a word of virtual data to a virtual address, outputs the virtual data word to a data permuter and the virtual address to an address permuter. The address permuter permutes the virtual address to a permuted address, and outputs the permuted address to an address inverter, which outputs a transformed address. This transformed address is outputted both to the memory and to the data permuter, which uses the transformed address to permute the virtual data word to a permuted data word, which it outputs to the data inverter. The data inverter also receives the transformed address from the address inverter, and uses it to invert the permuted data word to a transformed data word, which it outputs to the memory. It is to be noted that the virtual address must be both permuted and inverted before even the permutation of the virtual data word can be begun.

In FIG. 7b, a read operation is shown. The address transformation process is the same as in the write operation shown in FIG. 7a, but the data word transformation process is the inverse of that shown in FIG. 7a. In FIG. 7b, the CPU produces the virtual address from which it wishes to read data. This virtual address is outputted to the same address permuter as appears in FIG. 7a and produces the same permuted address. The permuted address is outputted to the same address inverter as in FIG. 7a, and produces the same transformed address as in FIG. 7a. This transformed address is outputted to the memory, also as in FIG. 7a. It is at this point that FIG. 7b differs from FIG. 7a. The memory produces the data word held at the transformed address, and outputs it to the data inverse inverter. This inverse inverter is the same as the data inverter of FIG. 7a, except that it operates on the data word as read from the memory rather than on the permuted data word from the data permuter. Since the transformed address is the same in both FIG. 1a and in FIG. 7b, the same selected bits which were inverted in FIG. 7a are reinverted in FIG. 7b, producing an inverse inverted data word in FIG. 7b which is identical to the permuted data word of FIG. 7a. This inverse inverted data word is outputted to the data inverse permuter which is, essentially, the right-hand side of FIG. 6. Equivalently, the inverse inverted data word is fed backward through the data permuter, the settings of which have been determined by the transformed address. The inverse inverted data word is thereby transformed into an inverse transformed data word, which is identical to the virtual data word originally outputted by the CPU in FIG. 7a.

INDUSTRIAL APPLICABILITY

The present invention is capable of exploitation in any computer memory in which it is desired to invert, permute, or both invert and permute the address at which a data word is to be stored, the data word itself, or both such address and such data word. Such inversion, permutation, or both, may be accomplished by especially designed hardware inserted into the memory lines, by software programming, or by both such hardware and such software.

While the preferred embodiment of the present invention has been described above, the present invention is not limited to such embodiment, and its true scope and spirit is set forth in the following claims.

What is claimed is:

1. A transformed data and address storage and retrieval apparatus comprising:
   (a) address transformation means comprising:
      (1) means for determining, for each virtual address, exactly one corresponding transformed address, each transformed address being determined by exactly one corresponding virtual address;
   (b) virtual information manipulation means comprising:
      (1) means for inputting, from a processing unit, a virtual word of data and exactly one corresponding virtual address to which the virtual data word is to be outputted from the processing unit;
      (2) means for transforming the virtual data word to a transformed word of data, the virtual data word transformation means further comprising means for combining the virtual data word with the transformed address set out in element (a) or with a combination of the virtual address and the transformed address; and
      (3) means for outputting, to a memory, the transformed data word and the transformed address; and
   (c) transformed information manipulation means comprising:
      (1) means for inputting, from the processing unit, a virtual address from which a virtual word of data is to be outputted from the processing unit;
      (2) means for outputting, to the memory, a transformed address determined from the virtual address by the address transformation means;

(3) means for inputting, from the memory, a word of data from the transformed address, the data word being considered to be a transformed data word subject to being inverse transformed to a virtual data word;

(4) means for inverse transforming the data word described in element (c)(3) to a virtual data word, the inverse transformation means being the inverse of the transformation means set out in element (b)(2); and (5) means for outputting, to the processing unit, the virtual data word.

2. The apparatus of claim 1, wherein the transformation means set out in element (b)(2) further comprises means for combining the virtual data word with the virtual address, or with a combination of the virtual address and the transformed address.

3. The apparatus of claim 1, wherein the virtual information manipulation means further comprises means for XORing each bit of the virtual data word with a corresponding inversion control bit.

4. The apparatus of claim 3, further comprising:

(d) means for ANDing together first and second multiplicands, the first multiplicand being a zeroth bit of a key and the second multiplicand being a corresponding bit of the transformed address, thereby forming a zeroth product;

(e) means for ANDing together third and fourth multiplicands, the third multiplicand being a first bit of the key and the fourth multiplicand being a corresponding bit of the transformed address, thereby forming a first product, the transformed address having at least as many bits as the virtual data word or the transformed data word set out in element (i);

(f) means for ANDing together fifth and sixth multiplicands, the fifth multiplicand being a second bit of the key and the sixth multiplicand being a corresponding bit of the transformed address, thereby forming a second product;

(g) means for ORing together zeroth, first, and second addends, the zeroth addend being the zeroth product set out in element (d), the first addend being the first product set out in element (e) and the second addend being the second product set out in element (f), thereby forming a sum;

(h) means for XORing the sum set out in element (g) with a third bit of the key, thereby forming an inversion control bit; and (i) means for selectively inverting a bit of the virtual data word or of the transformed data word by XORing the bit of the data word with the inversion control bit set out in element (h).

5. The apparatus of claim 4, wherein the data word has k bits, and wherein the means for forming an ith inversion control bit, where $0 \leq i \leq k-1$, comprises:

(j) means for ANDing together first and second ith multiplicands, the first ith multiplicand being the zeroth bit of the key and the second ith multiplicand being the xth bit of the transformed address or of a portion of the transformed address, where $0 \leq x \leq k-1$ and $x = i+1 < k$ and $x = i+1-k$ if $i+1 \geq k$, thereby forming a zeroth ith product;

(k) means for ANDing together third and fourth ith multiplicands, the third ith multiplicand being the first bit of the key and the fourth ith multiplicand being the yth bit of the transformed address or of a portion of the transformed address, where $0 \leq y \leq k-1$ and $y = i+2$ if $i+2 < k$ and $y = i+2-k$ if $i+2 \geq k$, thereby forming a first ith product;

(l) means for ANDing together fifth and sixth ith multiplicands, the fifth ith multiplicand being the second bit of the key and the sixth ith multiplicand being the zth bit of the transformed address or of a portion of the transformed address, where $0 \leq z \leq k-1$ and $z = i+3$ if $i+3 < k$ and $z = i+3-k$ if $i+3 \geq k$, thereby forming a second ith product;

(m) means for ORing together zeroth, first, and second ith addends, the zeroth ith addend being the zeroth ith product set out in element (j), the first ith addend being the first ith product set out in element (k), and the second ith addend being the second ith product set out in element (l), thereby forming an ith sum;

(n) means for XORing the ith sum set out in element (m) with the third bit of the key, thereby forming an ith inversion control bit; and (o) means for selectively inverting an ith bit of the virtual data word or of the transformed data word by XORing the ith bit of the data word with the ith inversion control bit set out in element (n).

6. A transformed memory data and address storage and retrieval apparatus comprising:

(a) address transformation means comprising:

(1) means for determining, for each virtual address, exactly one corresponding transformed address, wherein each transformed address is determined by exactly one corresponding virtual address;

(b) virtual information manipulation means comprising:

(1) means for inputting, from a processing unit, a virtual word of data and exactly one corresponding virtual address to which the virtual data word is to be outputted from the processing unit;

(2) means for determining, for each virtual data word, exactly one corresponding transformed data word, wherein each transformed data word is determined by exactly one corresponding virtual data word;

(c) transformed information manipulation means comprising:

(1) means for inputting, from the processing unit, a virtual address from which a virtual word of data is to be outputted from the processing unit;

(2) means for outputting, to a memory, a transformed address determined from the virtual address by the address transformation means;

(3) means for inputting, from the memory, a word of data from the transformed address, the data word being considered to be a transformed data word subject to being inverse transformed to a virtual data word;

(4) means for inverse transforming the data word described in element (c)(3) to a virtual data word, the inverse transformation means being the inverse of the transformation means set out in element (b)(2); and (5) means for outputting, to the processing unit, the virtual data word;

wherein:

(i) each transformed address and corresponding virtual address comprise an equal number of bits and the address transformation means further comprises means for permuting the bits of the virtual address; or (ii) each transformed data word and corresponding virtual data word comprise an equal number of bits and the virtual data transformation means further comprises means for permuting the bits of the virtual data word; or (iii) each transformed address and corresponding virtual address comprise an equal number of bits and the address transformation means further comprises means for permuting the bits of the virtual address, and each transformed data word and corresponding virtual data word comprise an equal number of bits and the virtual data transformation means further comprises means for permuting the bits of the virtual data word.

7. The apparatus of claim 6, wherein:

(d) the address transformation means further comprises means for inverting selected bits of the virtual address; or (e) the virtual data word transformation means further comprises means for inverting selected bits of the virtual data word; or (f) the address transformation means further comprises means for inverting selected bits of the virtual address, and the virtual data word transformation means further comprises means for inverting selected bits of the virtual data word.

8. The apparatus of claim 7, wherein the virtual information manipulation means further comprises:

(g) means for permuting the bits of the virtual data word depending on the virtual address; and (h) means for inverting the bits of the virtual data word depending on the transformed address.

9. The apparatus of claim 7, wherein the virtual information manipulation means further comprises means for inverting the bits of the virtual address, the virtual address bit inverting means comprising means for XORing the bits of the virtual address with corresponding bits of a key or a portion of a key.

10. The apparatus of claim 6, wherein the virtual information manipulation means further comprises means for determining, for each virtual data word, exactly one corresponding transformed data word, the determining means comprising:

(d) means for adding a data permutation portion of a key to
 (1) the virtual address,
 (2) the transformed address,
 (3) a portion of either of the foregoing, or
 (4) a combination of any of the foregoing, thereby forming a sum;

(e) means for dividing a dividend by a divisor, the dividend being the sum set out in element (d) and the divisor being the number of bits of the virtual data word, thereby forming a remainder; and (f) means for permuting the bits of the virtual data word according to the remainder;

each transformed data word being determined by exactly one corresponding virtual data word, and each transformed data word and corresponding virtual data word comprising an equal number of bits.

11. A transformed memory data and address storage and retrieval method comprising:

(a) an address transformation step comprising:
 (1) the step of determining, for each virtual address, exactly one corresponding transformed address, each transformed address being determined by exactly one corresponding virtual address;

(b) a virtual information manipulation step comprising:
 (1) the step of inputting, from a processing unit, a virtual word of data and exactly one corresponding virtual address to which the virtual data word is to be outputted from the processing unit;
 (2) the step of transforming the virtual data word to a transformed word of data, the virtual data word transformation step further comprising the step of combining the virtual data word with the transformed address set out in step (a) or with a combination of the virtual address and the transformed address; and
 (3) the step of outputting, to a memory, the transformed data word and the transformed address; and (c) a transformed information manipulation step comprising:
 (1) the step of inputting, from the processing unit, a virtual address from which a virtual word of data is to be outputted from the processing unit;
 (2) the step of outputting, to the memory, a transformed address determined from the virtual address by the address transformation step;
 (3) the step of inputting, from the memory, a word of data from the transformed address, the data word being considered to be a transformed data word subject to being inverse transformed to a virtual data word;
 (4) the step of inverse transforming the data word described in step (c)(3) to a virtual data word, the inverse transformation step being the inverse of the transformation step set out in step (b)(2); and
 (5) the step of outputting, to the processing unit, the virtual data word.

12. The method of claim 11, wherein the transformation step set out in step (b)(2) further comprises the step of combining the virtual data word with the virtual address, or with a combination of the virtual address and the transformed address.

13. The method of claim 11, wherein the virtual information manipulation step further comprises the step of XORing each bit of the virtual data word with a corresponding inversion control bit.

14. The method of claim 13, further comprising:

(d) the step of ANDing together first and second multiplicands, the first multiplicand being a zeroth bit of a key and the second multiplicand being a corresponding bit of the transformed address, thereby forming a zeroth product;

(e) the step of ANDing together third and fourth multiplicands, the third multiplicand being a first bit of the key and the fourth multiplicand being a corresponding bit of the transformed address, thereby forming a first product, the transformed address having at least as many bits as the virtual data word or the transformed data word set out in step (i);

(f) the step of ANDing together fifth and sixth multiplicands, the fifth multiplicand being a second bit of the key and the sixth multiplicand being a corresponding bit of the transformed address, thereby forming a second product;

(g) the step of ORing together zeroth, first, and second addends, the zeroth addend being the zeroth product set out in step (d), the first addend being the first product set out in step (e), and the second addend being the second product set out in step (f), thereby forming a sum;

(h) the step of XORing the sum set out in step (g) with a third bit of the key, thereby forming an inversion control bit; and (i) the step of selectively inverting a bit of the virtual data word or of the transformed data word by XORing the bit of the data word with the inversion control bit set out in step (h).

15. The method of claim 14, wherein the data word has k bits, and wherein the step of forming an ith inversion control bit, where $0 \leq i \leq k-1$, comprises:

(j) the step of ANDing together first and second ith multiplicands, the first ith multiplicand being the zeroth bit of the key and the second ith multiplicand being the xth bit of the transformed address or of a portion of the transformed address, where $0 \leq x \leq k-1$ and $x = i+1$ if $i+1 < k$ and $x = i+1-k$ if $i+1 \geq k$, thereby forming a zeroth ith product;

(k) the step of ANDing together third and fourth ith multiplicands, the third ith multiplicand being the first bit of the key and the fourth ith multiplicand being the yth bit of the transformed address or of a portion of the transformed address, where $0 \leq y \leq k-1$ and $y = i+2$ if $i+2 < k$ and $y = i+2-k$ if $i+2 \geq k$, thereby forming a first ith product;

(l) the step of ANDing together fifth and sixth ith multiplicands, the fifth ith multiplicand being the second bit of the key and the sixth ith multiplicand being the zth bit of the transformed address or of a portion of the transformed address, where $0 \leq z \leq k-1$ and $z = i+3$ if $i+3 < k$ and $z = i+3-k$ if $i+3 \geq k$, thereby forming a second ith product;

(m) the step of ORing together zeroth, first, and second ith addends, the zeroth ith addend being the zeroth ith product set out in step (j), the first ith addend being the first ith product set out in step (j), and the second ith addend being the second ith product set out in step (l), thereby forming an ith sum;

(n) the step of XORing the ith sum set out in step (m) with the third bit of the key, thereby forming an ith inversion control bit; and (o) the step of selectively inverting an ith bit of the virtual data word or of the transformed data word by XORing the ith bit of the data word with the ith inversion control bit set out in step (n).

16. A transformed memory data and address storage and retrieval method comprising:

(a) an address transformation step comprising:
 (1) the step of determining, for each virtual address, exactly one corresponding transformed address, wherein each transformed address is determined by exactly one corresponding virtual address;

(b) a virtual information manipulation step comprising:
 (1) the step of inputting, from a processing unit, a virtual word of data and exactly one corresponding virtual address to which the virtual data word is to be outputted from the processing unit;
 (2) the step of determining, for each virtual data word, exactly one corresponding transformed data word, wherein each transformed data word is determined by exactly one corresponding virtual data word;

(c) a transformed information manipulation step comprising:

(1) the step of inputting, from the processing unit, a virtual address from which a virtual word of data is to be outputted from the processing unit;

(2) the step of outputting, to a memory, a transformed address determined from the virtual address by the address transformation step;

(3) the step of inputting, from the memory, a word of data from the transformed address, the data word being considered to be a transformed data word subject to being inverse transformed to a virtual data word;

(4) the step of inverse transforming the data word described in step (c)(3) to a virtual data word, the inverse transformation step being the inverse of the transformation step set out in step (b)(2); and (5) the step of outputting, to the processing unit, the virtual data word;

wherein:

(i) each transformed address and corresponding virtual address comprise an equal number of bits and the address transformation step further comprises the step of permuting the bits of the virtual address; or (ii) each transformed data word and corresponding virtual data word comprise an equal number of bits and the virtual data transformation step further comprises the step of permuting the bits of the virtual data word; or (iii) each transformed address and corresponding virtual address comprise an equal number of bits and the address transformation step further comprises the step of permuting the bits of the virtual address, and each transformed data word and corresponding virtual data word comprise an equal number of bits and the virtual data transformation step further comprises the step of permuting the bits of the virtual data word.

17. The method of claim 16, wherein:

(d) the address transformation step further comprises the step of inverting selected bits of the virtual address; or (e) the virtual data transformation step further comprises the step of inverting selected bits of the virtual data word; or (f) the address transformation step further comprises the step of inverting selected bits of the virtual address, and the virtual data transformation step further comprises the step of inverting selected bits of the virtual data word.

18. The method of claim 17, wherein the virtual information manipulation step further comprises:

(g) the step of permuting the bits of the virtual data word depending on the virtual address; and (h) the step of inverting the bits of the virtual data word depending on the transformed address.

19. The method of claim 17, wherein the virtual information manipulation step further comprises the step of inverting the bits of the virtual address, the virtual address bit inverting step comprising the step of XORing the bits of the virtual address with corresponding bits of a key or a portion of a key.

20. The method of claim 16, wherein the virtual information manipulation step further comprises the step of determining, for each virtual data word, exactly one corresponding transformed data word, the determining step comprising:

(d) the step of adding a data permutation portion of a key to
  (1) the virtual address,
  (2) the transformed address,
  (3) a portion of either of the foregoing, or
  (4) a combination of any of the foregoing, thereby forming a sum;
(e) the step of dividing a dividend by a divisor, the dividend being the sum set out in step (d) and the divisor being the number of bits of the virtual data word, thereby forming a remainder; and
(f) the step of permuting the bits of the virtual data word according to the remainder;
each transformed data word being determined by exactly one corresponding virtual data word, and each transformed data word and corresponding virtual data word comprising an equal number of bits.

* * * * *